March 18, 1941.     A. Y. DODGE     2,235,672
TRANSMISSION
Filed Jan. 26, 1935     2 Sheets-Sheet 1
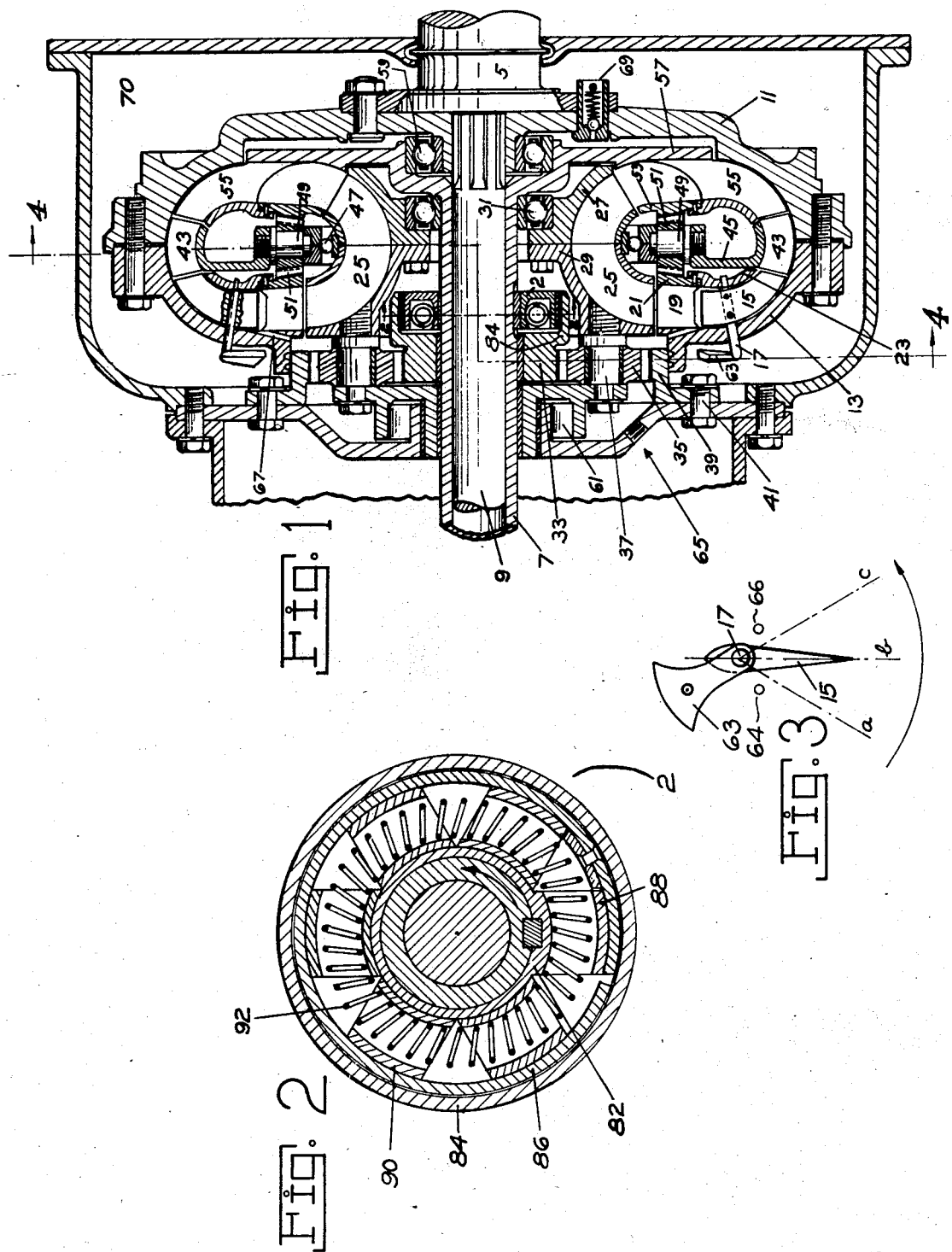
INVENTOR.
ADIEL Y. DODGE
BY
ATTORNEY.

Patented Mar. 18, 1941

2,235,672

UNITED STATES PATENT OFFICE 2,235,672

TRANSMISSION

Adiel Y. Dodge, South Bend, Ind.

Application January 26, 1935, Serial No. 3,544

17 Claims. (Cl. 60—54)

This invention relates to transmissions, and is illustrated as embodied in a fluid torque converter, of the type having a plurality of coaxial vaned rotatable elements drivably connected by a liquid which is transmitted progressively from one rotor to another.

One of the difficulties with transmissions of this type is the fact that, since the effect of the vanes on the liquid is the resultant of the effect of the vane angle and of the speed of rotation of the vanes, the effect is different at different speeds, and the correct vane angle for one speed is not the correct angle at another speed.

In one of the vane members, as for example the driving rotor, I propose to correct for this by the use of movable vanes which are automatically shifted to different angles at different speeds. In the arrangement illustrated, the vanes are swung about pivots by means shown as a series of centrifugally operated weights, which are preferably so mounted relatively to the pivots that they tend to approach a dead center position; and thus become less effective at low speeds.

The effect between two of the vaned members, for example between the driving and driven rotors, according to one feature of my invention is modified by introducing an intermediate rotor constrained to turn at a speed between the speeds of the driving and driven rotors, so that the effect is divided into two steps. In the drawings the driving, intermediate, and driven rotors are interconnected by differential gearing, and another novel feature relates to forming the annular sectional core, carried by these rotors or by their vanes, to enclose this gearing.

Another of the rotatable members, herein shown as the stator or reaction member, preferably provided with means such as a one-way clutch preventing it from turning backward, at a certain speed is connected by planetary gearing or the like to the driven rotor, to turn therewith but at a lower speed (e. g. at about one-fourth the speed). Thus a considerable part of the effectiveness of the stator as a positive or negative reaction member is retained even at speeds where it has previously been proposed to let it turn idly forward, or to clutch it directly to the driven rotor to turn therewith. It should be borne in mind that a positive reactionary force is required to produce torque increase and a negative reactionary force is required to produce over drive. By over drive is meant, higher speeds of rotation than that of the prime mover, hence less torque than that of the prime mover. The connection, when the predetermined speed is reached, is shown made by means of a centrifugal clutch which in itself embodies substantial novelty.

According to another important feature of the invention, I provide a fluid torque converter which is capable of producing overdrive or drive of the driven member at a higher speed and consequently less torque than the driving member. This is preferably accomplished by permitting the stator to rotate but restraining its rotation as described above and by arranging the impeller and rotor so that the centrifugal fluid head is greater on the impeller side than the rotor side of the converter. By this arrangement the stator provides the negative reactionary force necessary for overdrive and the greater fluid head on the impeller side assures circulation of the fluid.

The above and other objects and features of the invention, including various novel combinations of parts and desirable particular constructions, will be apparent from the following description of the illustrative embodiment shown in the accompanying drawings, in which:

Figure 1 is a vertical longitudinal section with parts in elevation;

Figure 2 is an enlarged cross section, in part on the line 2—2 of Figure 1, showing a cross section of an automatic clutch;

Figure 3 is a diagram showing certain parts in elevation to illustrate the relation of a counterweight to a pivoted impeller blade.

Figure 4:
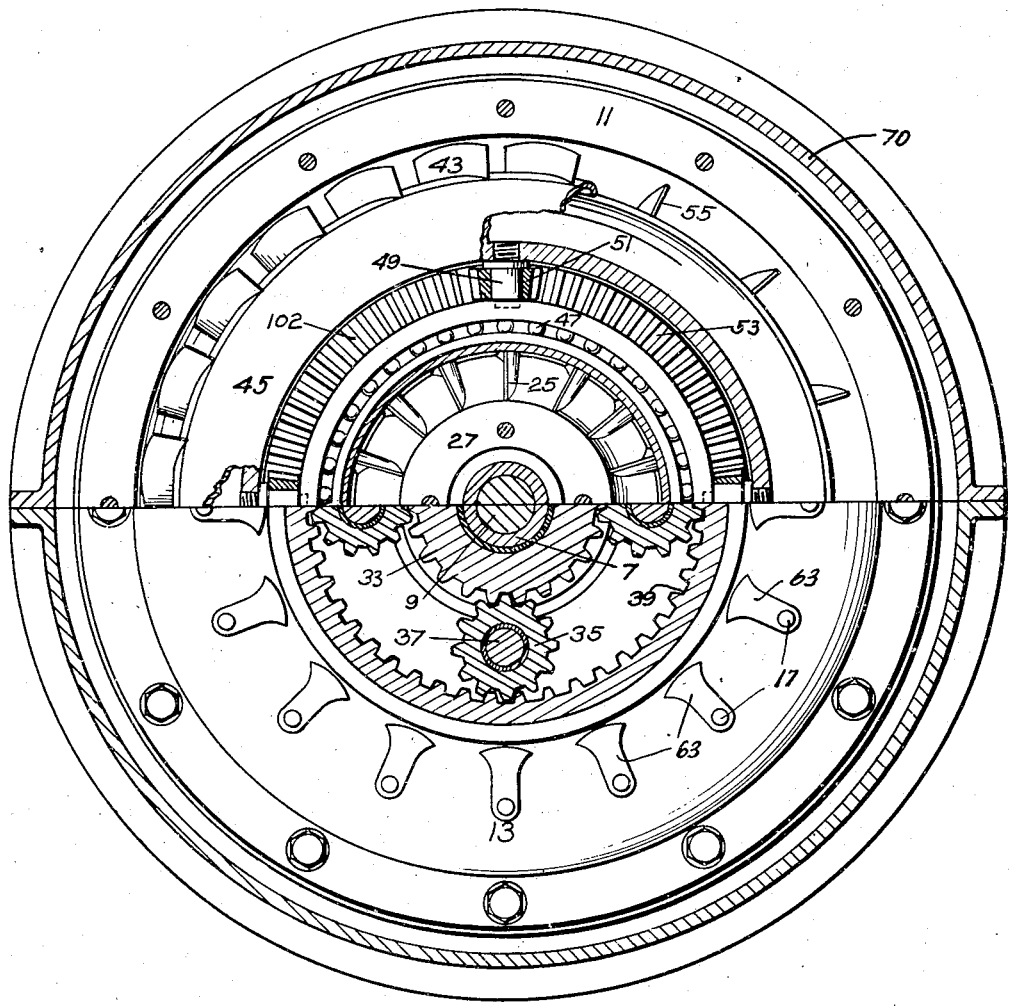
Figure 4 is a cross section on the line 4—4 of Figure 1.

Referring to Figure 1, part 5 is the input or drive shaft, part 7 is the output or driven shaft, and part 9 is a center shaft which may be used for a direct connection to one element of a planetary gear which has another element driven by the shaft 7, as previously described in my copending application No. 723,083, filed April 30, 1934, should it be desired to connect the torque converter herein described in the manner described in said application No. 723,083. The flywheel proper is shown at 11, suitably fastened to the drive shaft 5. A flywheel cover 13 is suitably secured to the flywheel 11.

Located in the flywheel cover 13 are movable impeller vanes 15 preferably pivoted on trunnions 17, and fixed impeller vanes 19 arranged within and secured to the flywheel cover 13. The parts of the impeller core associated with these vanes are shown comprised of two parts or rings 21 and 23.

The ring 21, in addition to forming part of the impeller core, also forms a part of a bevel ring gear, similar to the one the teeth of which are shown in Figure 4 at 102. Rings 21 and 23 are suitably secured together to form the complete impeller core section.

The stator blades are shown at 25. The stator is composed of a stator shell formed of sections 27 and 29 suitably bolted together. The stator is preferably made in two parts in this manner to facilitate assembly. The stator assembly is mounted on a ball bearing 31 so that it may turn concentrically about the main axis of the shafts 5, 7, and 9, the turning being governed by an automatic clutch 2 illustrated in Figure 2.

This clutch turns a sun gear 33 which in turn acts on planet gears 35 which are pivoted on the stator by means such as trunnions 37 and which mesh with a stationary internal gear 39 secured to the casing by bolts or the like at 41.

Auxiliary rotor blades 43 are secured to an auxiliary rotor 45 which is mounted on a ball bearing 47 through trunnions or pins 49 carrying a ring encircling the ball bearings. On the trunnions 49 are mounted bevel planet gears 51 meshing with the ring gear located on the impeller core 21 and another ring gear formed on the main rotor core section 53. Rotor vanes 55 are mounted on a main rotor or turbine runner 57 which is shown integral with shaft 7. The rotor 57 and the shaft 7 are shown mounted on a ball bearing 59.

The stator assembly 27 and 29 and the planet assembly described above are provided with a one-way clutch 61, shown as being of the roller type, to prevent the stator parts from reverse rotation while allowing them to revolve in the direction of rotation of the prime mover.

It will be noted that the impeller blade trunnions 17 are provided with counter-weights 63.

Figure 2 shows a cross section through the novel automatic clutch 2. A core 82 is suitably secured to the shaft 7 and revolves therewith. A drum 84 is integral with the sun gear 33 shown in Figure 1 and revolves therewith. Inside of the drum 84 there is an expansible band 86 which abuts against an extension 88 of the core 82. The band 86 is arranged so that when the shaft 7 turns in the direction of the arrow thereon internal wrapping action will be produced to lock it frictionally to the drum 84. The band 86 is shown provided with a series of weights 90 secured to the band 86 and provided with a recess through which a garter type spring 92 may be placed. The garter type spring 92 holds the band 86 and the weights 90 normally out of engagement with the drum 84.

When the shaft 7 turns at a predetermined speed, centrifugal force causes the weights 90 and the band 86 to expand outwardly against the tension of the spring 92, thus allowing the band 86 to engage the drum 84. Due to the wrapping action previously described, the band 86 will firmly take hold of the drum 84 at a slight increase in speed, sufficiently to cause drum 84 to turn band 86 and shaft 7. Therefore, at some predetermined speed sun gear 33 of Figure 1 will be caused to turn at the rate of revolution of the shaft 7.

Figure 3 diagrammatically shows the relation of the weights 63 to the pivoted impeller blades 15. Each weight 63 is so placed that when its pivoted blade 15 assumes a back angle of something in the neighborhood of 40° to 45° with its center line in position a, the center of gravity of the weight 63 falls approximately on a radial center line, though preferably it is always slightly displaced therefrom, thus substantially neutralizing the effect of the weight 63. If desired a suitable stop pin in 64 may be provided to limit the back angle movement of blade 15. However, the weight of the pivoted blade 15 due to centrifugal force tends to cause the blade to assume a radial position. The fluid pressure on the blade 15 restrains it from assuming a radial position at low speeds. At low speeds of the driven shaft, due to the action of the stator, a relatively greater flow of fluid takes place in opposition to the centrifugal force of the blades 15.

As the rotative speed of the impeller increases, centrifugal force tending to cause each blade 15 to assume a radial position increases, but as the blades 15 approach a radial position the force tending to bring them into the radial position decreases due to the decrease of the angular displacement of the center of gravity of the blades. But, as the center of gravity of blade 15 approaches dead center with its center line in position b, the center of gravity of the weight 63 becomes increasingly more effective as it assumes a position farther and farther away from the dead center. By the position of the weight 63 and the proper selection of the amount of weight therein I am able to secure the desired results of changing the angularity of the impeller blades from a back angle of 40° or 45° at comparatively low speeds and heavier torques to a forward angle of 10° to 30° as represented by center line c as desired at high speeds and low torques. A suitable stop pin 66 is preferably provided to limit the forward angle movement of the blade.

The bevel ring gear attached to the rotor core 53 is illustrated in Figure 4 at 102. This view shows how this ring gear meshes with the bevel planet gears 51.

In operation, and referring back to Figure 1, fluid is admitted under pressure of gravity or by means of a force feed through a tapped hole 65 and passes around the planet gears 35 and is admitted into the torque converted through suitable ports 67 and is then carried into the above-described mechanism by centrifugal force. Fluid is allowed to escape through a blow-off valve or check 69 at a predetermined pressure. Fluid admitted at the tapped hole 65 is taken from the flywheel housing 70. In this way the fluid is used over and over again, returned to and taken from the space 70. By means of the blow-off valve 69 a predetermined desired pressure may be maintained internally in the torque converter and fluid retained therein when the torque converter is at rest.

I have thus provided a torque converter having an auxiliary rotor 43—45 which turns at half the difference in speed existing between the impeller and the main rotor with the impeller and main rotor turning in the same direction. The force of the fluid acts against the auxiliary rotor blades 43 and is imparted partly to the impeller and partly to the main rotor. This decreases the large peripheral difference in speed which takes place between the exiting tip of the impeller blade and the entering tip of the rotor blade when operating at a large difference in speed, thus increasing the efficiency in this higher torque range. The pivoted impeller blade which automatically changes its angle as the speed changes will be advisable in some conditions whereas in other installations where the difference in speed between the impeller and rotor is not so great, it is not entirely necessary to use the pivoted impeller blades.

When starting the load from rest the main rotor does not turn, and the auxiliary rotor turns at half the difference in speed, and therefore at half the speed of the impeller. The stator does not turn inasmuch as clutch 2 has not become engaged and due to the one-way clutch 61 the stator is restrained from reverse movement, thus forming a fixed reactionary member. However, as the load is picked up the rotor 57 and the rotor shaft 7 increase in speed and at some predetermined speed the automatic clutch 2 becomes engaged, causing the sun gear 33 to revolve, in turn causing the stator to revolve forwardly but at a speed reduced below that of the rotor shaft 7.

This reduced speed is at a ratio having a relation with the discharge angle of the rotor blades 55 such that when the rotor and the rotor blades 55 turn at nearly the speed of the impeller the peripheral speed of the intake of the stator will be approximately that of the peripheral component of the fluid leaving the rotor. In this way, at moderately high speeds the stator offers little resistance to the flow of fluid and in effect becomes either a slow speed impeller or a slow speed auxiliary rotor. While it is true that the force which turns the stator, causing it to become a slow speed impeller, is taken from the output shaft the benefits therefrom are given over to the impeller by means of the circulating fluid, thus making the torque converter a regenerative circuit to a greater extent than heretofore. Under other conditions of speed and load, such as high speed light load, the stator acts as an auxiliary rotor tending to help turn the shaft 7 and imparts a negative reaction to ring 39.

When the resultant component of the fluid from the rotor impinges against the stator in such a way as to drive the stator forwardly, the stator becomes, in effect, an auxiliary rotor. Thus the stator provides a negative reaction member necessary for overdrive. The power delivered to the stator under this condition is delivered to the driven shaft through gear 33 and clutch 2 in the form shown though any other suitable means for restraining rotation of the stator might be used, the stator forming the necessary negative reaction member for overdrive regardless of any connection to the driven shaft.

At higher speeds, the auxiliary rotor turns at a speed very nearly approaching the speed of the impeller and the rotor, and the hydraulic force imparted to the auxiliary rotor blades 43 is given off through the bevel ring gear to both the rotor and impeller. That which is given off to the impeller helps the prime mover to turn mechanically and is converted into fluid energy, thus carrying the regenerative character of the torque converter a step further.

While the steps just described are indirect means of securing the desired end and therefore within themselves are not efficient, their effect on the hydraulic system is such as to decrease the hydraulic inefficiency to an extent far greater than their own inefficiency, due to their indirect means to an end. While this invention as illustrated embodies three novel means for improving the hydraulic efficiency any one or more of them may be used to advantage omitting any one or two of them.

It will be noted that the rotor blades 55 are shorter than the impeller blades and terminate short of the intake of the stator. This leaves a free space in which the fluid is rotating less rapidly than in the rotor blades due to the component in a negative direction it receives from the rotor. From an inspection of Figure 1 it will be clear that the column of fluid in the rotor vanes is shorter than that in the impeller vanes so that the fluid head on the impeller side is always greater than on the rotor side, thus assuring circulation of the fluid in the proper manner even when the rotor is going faster than the impeller. This is further assisted by the fact that the stator is longer on the impeller side than the rotor side so that when it is rotating it creates within itself a greater head on the impeller side to assist in circulation of the fluid. By this arrangement, together with arrangement of the stator to provide a negative reaction member, overdrive is made possible.

During overdrive with the main rotor turning faster than the impeller, the auxiliary rotor also turns faster than the impeller but slower than the main rotor. Therefore, the auxiliary rotor absorbs a certain amount of force from the fluid which force is divided between the impeller and main rotor by the gearing in the same manner as described above in connection with normal drive.

In transmissions of the type described above, I find it desirable to use a liquid which is relatively heavy, having a specific gravity preferably above 1.2, which has a low viscosity (of about 90 min. Saybolt at 100° F.), which has at least some lubricating value, which has a high boiling point of preferably 300° F. or more, which has a freezing point at least as low as 25° F. below zero, which will not corrode the metals of the transmission, which does not have a considerable tendency to foam when agitated, and which preferably can be made from readily-obtainable materials.

Among such liquids are chlorinated hydrocarbon oils containing chlorinated naphthalene or alpha-chloronaphthalene, preferably with a small amount of bicarbonate of soda or the like to neutralize any acid that may form. Another such liquid is a mixture of approximately 50% carbon dichloride (or tetrachloroethylene) and 50% heavy paraffine base lubricating oil. To this may be added a small amount (e. g. 4%) isohexylamine or triethynolamine, to neutralize any acid that may form. Another suitable liquid consists of about 45% tetrabromoethane, with the same amount of heavy lubricating oil and the remaining 10% of a suitable alkaline solution.

Other substances which may be used in place of the tetrabromoethane are acetyle tetrabromide, ethylene bromide, dibromohydrin, and chloripicrin. Chlorinated naphthalene may be substituted for some or all of the lubricating oil.

There are also advantages in using mercury, especially as its weight is so great as to reduce the size of transmission necessary. However, I prefer to mix some lubricating oil with the mercury. When the transmission is at rest the oil protects the surface of the mercury. When the transmission is turning, the oil is driven by the heavier mercury to the axis of the transmission, where it effectively lubricates the bearings, etc.

While one illustrative embodiment has been described in detail, it is not my intention to limit the scope of the invention to that particular embodiment, or otherwise than by the terms of the appended claims.

I claim:

1. A transmission unit comprising coaxial rotatable driving, driven and intermediate members having cooperating vanes, means forming a sectional ring-shaped core carried by said vanes, and gearing within said core interconnecting said members.

2. A transmission unit comprising coaxial rotatable driving, driven and intermediate members having cooperating vanes, means forming a sectional ring-shaped core carried by said vanes, and driving means arranged within said core and interconnecting said members.

3. A transmission unit comprising an impeller member having driving vanes provided with centrifugal means determining their angular position and having a ring gear, a driven member having vanes and a ring gear, pinions meshing with said ring gears, and an intermediate member carrying said pinions and having vanes receiving fluid from the driving vanes and transmitting it to the driven vanes.

4. A transmission unit for connecting a driving shaft to a driven shaft comprising an impeller member connected to the driving shaft and having driving vanes and having a ring gear, a driven member connected to the driven shaft and having vanes and a ring gear, pinions meshing with said ring gears, and an intermediate member carrying said pinions and having vanes receiving fluid from the driving vanes and transmitting it to the driven vanes said intermediate member being driven at a speed between that of the impeller and that of the driven member by said ring gears and pinions.

5. A transmission unit comprising an impeller member having driving vanes and having a ring gear, a driven member having vanes and a ring gear, pinions meshing with said ring gears, an intermediate member carrying said pinions and having vanes receiving fluid from the driving vanes and transmitting it to the driven vanes, and a stator having vanes receiving fluid from the driven vanes and transmitting it to the driving vanes.

6. A transmission unit for connecting a driving shaft to a driven shaft comprising an impeller member connected to the driving shaft and having driving vanes and having a ring gear, a driven member connected to the driven shaft and having vanes and a ring gear, pinions meshing with said ring gears, and an intermediate member carrying said pinions and having vanes receiving fluid from the driving vanes and transmitting it to the driven vanes, at least one of said sets of vanes being adjustable to different angular positions.

7. A transmission unit comprising an impeller member having driving vanes and having a ring gear, a driven member having vanes and a ring gear, pinions meshing with said ring gears, an intermediate member carrying said pinions and having vanes receiving fluid from the driving vanes and transmitting it to the driven vanes, and a stator having vanes receiving fluid from the driven vanes and transmitting it to the driving vanes, at least one of said sets of vanes being adjustable to different angular positions.

8. A transmission unit comprising an impeller member having driving vanes and having a ring gear, a driven member having vanes and a ring gear, pinions meshing with said ring gears, and an intermediate member carrying said pinions and having vanes receiving fluid from the driving vanes and transmitting it to the driven vanes, said vanes being provided with rings forming a core in a plurality of sections, two of which carry said ring gears, with the pinions arranged inside of said core.

9. A transmission unit comprising an impeller member having driving vanes and having a ring gear, a driven member having vanes and a ring gear, pinions meshing with said ring gears, an intermediate member carrying said pinions and having vanes receiving fluid from the driving vanes and transmitting it to the driven vanes, and a stator having vanes receiving fluid from the driven vanes and transmitting it to the driving vanes, said vanes being provided with rings forming a core in a plurality of sections, two of which carry said ring gears, with the pinions arranged inside of said core, the core section carried by the stator having bearing means rotatably supporting the intermediate member and its pinions.

10. A transmission unit comprising driving and driven vaned members, and a vaned stator receiving fluid from the driven member and transmitting it to the driving member, a one-way holding means preventing backward rotation of the stator and centrifugal means connecting the stator to the driven member for forward rotation therewith above a definite speed of the driven member.

11. A transmission unit comprising driving and driven vaned members, and a vaned stator receiving fluid from the driven member and transmitting it to the driving member and speed-controlled means connecting the stator to the driven member for forward rotation therewith above a definite speed of the driven member.

12. A fluid torque converted comprising a driving rotor and a driven rotor mounted for rotation in the same direction, in combination with an intermediate rotor constrained to turn in the same direction as and at a speed between the speeds of the driving and driven rotors and receiving fluid from the driving rotor and transmitting it to the driven rotor.

13. A fluid torque converted comprising a driving rotor and a driven rotor mounted for rotation in the same direction, an intermediate rotor receiving fluid from the driving rotor and transmitting it to the driven rotor, and means interconnecting the three rotors and causing the intermediate rotor to turn in the same direction as and at a speed midway between the speeds of the other two rotors.

14. A fluid torque converter comprising rotors and a stator associated therewith and receiving fluid from one rotor and transmitting it to another, in combination with means connecting the stator to one of the rotors to be driven thereby in the same direction as and at a lower speed than said one of the rotors.

15. A fluid torque converter comprising rotors and a stator associated therewith and receiving fluid from one rotor and transmitting it to another, in combination with means preventing the stator from turning backward and means operative above a certain speed of one of said rotors for connecting the stator to said one of the rotors to be driven thereby at a lower speed than said rotor.

16. A fluid torque converter comprising an impeller, a rotor and a stator and speed varying means connecting the stator to the rotor for restraining movement of the stator in a forward direction to a speed less than the rotor speed whereby it provides a negative reaction member for overdrive.

17. A fluid torque converter for overdrive comprising an impeller, a rotor and a stator providing a torroidal fluid path, said impeller and rotor being so constructed and arranged that the impeller will produce a greater fluid head than the rotor even when rotating slower, and speed varying means connecting the stator to the rotor for restraining forward movement of the stator to a speed less than the rotor speed whereby it provides a negative reaction member for overdrive.

ADIEL Y. DODGE.